(12) United States Patent
Thornberg et al.

(10) Patent No.: US 8,201,438 B1
(45) Date of Patent: Jun. 19, 2012

(54) DETECTION OF GAS LEAKAGE

(75) Inventors: Steven Thornberg, Peralta, NM (US); Jason Brown, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 407 days.

(21) Appl. No.: 12/424,791

(22) Filed: Apr. 16, 2009

Related U.S. Application Data

(60) Provisional application No. 61/046,174, filed on Apr. 18, 2008.

(51) Int. Cl.
*G01M 3/34* (2006.01)
(52) U.S. Cl. ......................... 73/49.3; 73/49.2
(58) Field of Classification Search ............ 73/49.2, 73/49.3
See application file for complete search history.

(56) References Cited

U.S. PATENT DOCUMENTS

| | | | |
|---|---|---|---|
| 5,261,268 A | 11/1993 | Namba | |
| 5,412,978 A * | 5/1995 | Boone et al. | 73/49.2 |
| 5,428,985 A | 7/1995 | Kurtz et al. | |
| 6,286,362 B1 * | 9/2001 | Coffman et al. | 73/40.7 |
| 6,840,089 B2 * | 1/2005 | Docy et al. | 73/49.7 |
| 7,168,297 B2 | 1/2007 | Herzog et al. | |
| 7,454,957 B2 | 11/2008 | Lehmann | |
| 7,500,381 B2 | 3/2009 | Palenstyn et al. | |
| 2005/0126265 A1 * | 6/2005 | Herzog et al. | 73/49.2 |
| 2009/0136361 A1 * | 5/2009 | Greven et al. | 417/45 |

OTHER PUBLICATIONS

S.M. Thornberg and J. Brown, Description of the Power-Free Pump Module, Presented at the GT-IMOG Conference, Amarillo, TX, May 2007.

* cited by examiner

*Primary Examiner* — Hezron E Williams
*Assistant Examiner* — Mark A Shabman
(74) *Attorney, Agent, or Firm* — Elmer A. Klavetter; Kevin W. Bieg

(57) ABSTRACT

A method of detecting leaks and measuring volumes as well as an apparatus, the Power-free Pump Module (PPM), that is a self-contained leak test and volume measurement apparatus that requires no external sources of electrical power during leak testing or volume measurement, where the invention is a portable, pneumatically-controlled instrument capable of generating a vacuum, calibrating volumes, and performing quantitative leak tests on a closed test system or device, all without the use of alternating current (AC) power. Capabilities include the ability is to provide a modest vacuum (less than 10 Torr), perform a pressure rise leak test, measure the gas's absolute pressure, and perform volume measurements. All operations are performed through a simple rotary control valve which controls pneumatically-operated manifold valves.

6 Claims, 3 Drawing Sheets

DETECTION OF GAS LEAKAGE

RELATED APPLICATIONS

This application claims the benefit of U.S. Provisional Application No. 61/046,174, filed on Apr. 18, 2008.

This invention was made with Government support under Contract No. DE-AC04-94AL85000 awarded by the Department of Energy. The Government has certain rights in the invention.

BACKGROUND OF THE INVENTION

The present invention relates generally to a method of detecting gas leakage and more particularly, to a method of detecting gas leakage without using an alternating current (A/C) source and to an apparatus for detecting gas leakage.

Performing gas sampling and leak test operations is becoming more and more difficult as safety requirements increase due to the reluctance of having powered (for example, A/C power) testers in sensitive or hazardous applications. For example, in some static sensitive or hazardous (e.g., flammable, poisonous) applications and the current safety rules, powered test equipment cannot be used when electrical discharges (for example, when lightning storms are in the area, when electrical motors (for example, vacuum pumps) are operated) are possible, which greatly reduces production throughput.

Typical leak test instruments are bulky and require NC power and gas cylinders (for example, helium). None of existing instruments incorporate the on-board capability to measure volume, a necessary parameter for calculating and interpreting pressure rise leak rates. Additionally, most of these instruments require lengthy warm-up times. Leak test instruments have applications in industries including aerospace, automotive, refrigeration, defense, oil and gas, semiconductor, and renewable (for example, solar) energy.

DETAILED DESCRIPTION OF THE INVENTION

The present invention is both a method of detecting leaks and measuring volumes as well as an apparatus, the Power-free Pump Module (PPM), that is a self-contained leak test and volume measurement apparatus that requires no external sources of electrical power during leak testing or volume measurement.

In one embodiment, the invention is a portable, pneumatically-controlled instrument capable of generating a vacuum, calibrating volumes, and performing quantitative leak tests on a closed test system or device, all without the use of alternating current (AC) power. Testing can begin literally within seconds whereas typical leak detectors can take up to an hour to warm up and stabilize. Capabilities include the ability is to provide a modest vacuum (less than 10 Torr), perform a pressure rise leak test, measure the gas's absolute pressure, and perform volume measurements. All operations are performed through a simple rotary control valve which controls pneumatically-operated manifold valves. This instrument addresses the technical problem of not being able to use conventional AC-powered testers in static-sensitive or hazardous applications.

In one embodiment of the method for detecting leaks, a self-contained device is to be tested for leakage (that is, test device) by a diagnostic apparatus referred to herein as a Power-free Pump Module (PPM). The PPM is connected only to a compressed gas source and to the test device. Its power is self-contained and no alternating current (A/C) source is required.

Figure 1:
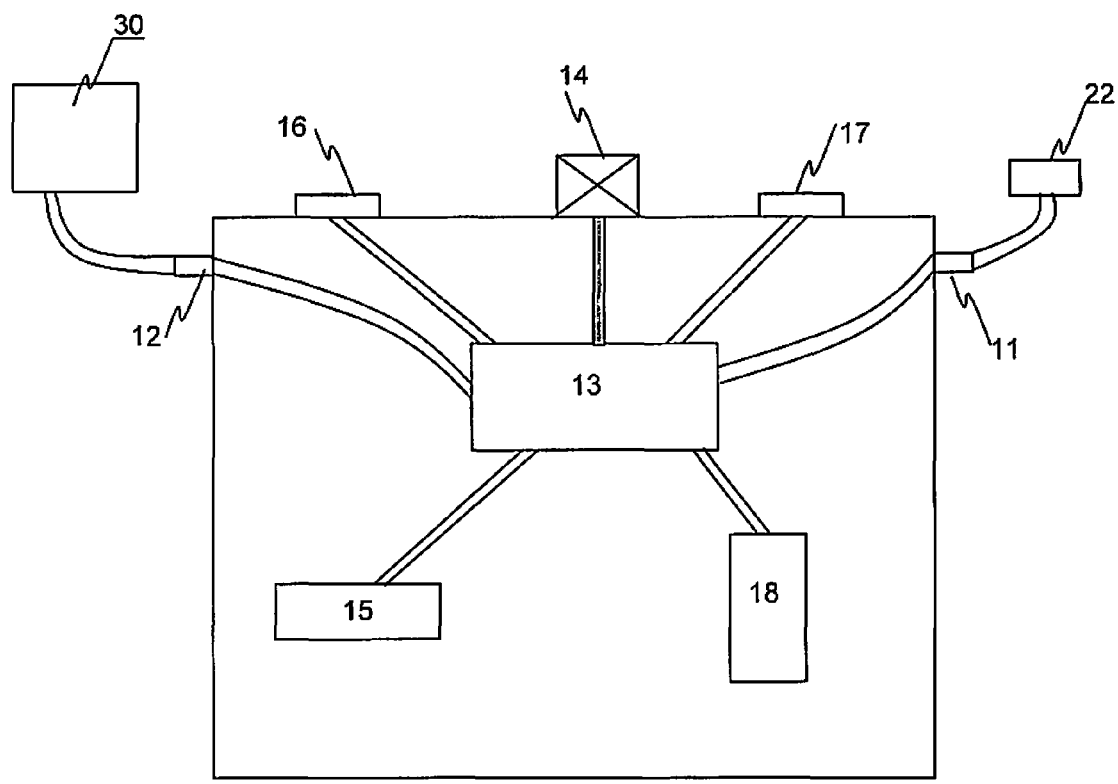
FIG. 1 shows an illustration of the diagnostic gas leakage and volume calibration device of the present invention.

As depicted in FIG. 1, the PPM comprises a housing 10 that comprises a first port 11 that can be fluidically connected to a compressed gas source 22, either external or internal to the housing, and also connected to a manifold 13, where the connection contains a means to control flow of the compressed gas, such as with a simple ball valve that can stop or start the flow of the compressed gas. In one embodiment, the compressed gas is readily available compressed air at a pressure of approximately 70-90 psig but can be any available gas at pressures compatible with other elements in the PPM system. In one embodiment, an in-line filter is provided to filter the compressed air. The housing 10 also comprises a second port 12 that can be fluidically connected to the test device 30 and also connected to the manifold 13. The manifold 13 can be of manufacture standard in the art that is simply a chamber having multiple apertures or ports for making fluidic connections where the connections can be controlled by a control valve 14 mounted on the housing. The manifold 13 is also connected to a means 15 for creating a vacuum, such as a venture pump or similar device capable of providing a vacuum down to approximately 1-10 Torr. The manifold 13 can be optionally connected to a container 18 with a known volume. Connected to the manifold 13 are two means for measuring pressures; the first pressure means 16 can measure the absolute pressure and the second pressure means 17 can measure a pressure differential to a level dependent upon the application. In one embodiment, a pressure differential down to 0.001 Torr can be determined. Both the first and second pressure means can be gauges that require no power or can be digital devices that are powered by a direct current (DC) voltage source such as a dry cell battery.

In one embodiment, the connection lines fluidically connecting the manifold 13 to the ports 11 and 12, the pressure means 16 and 17, the control valve 14, the known volume container 18 and the vacuum source 15 utilize some valve means, such as pneumatic valves to control the flow. The control valve 14 directs fluid flow through the manifold 13 to apply compressed gas to the active pneumatic valves and vent inactive valves.

Figure 2:
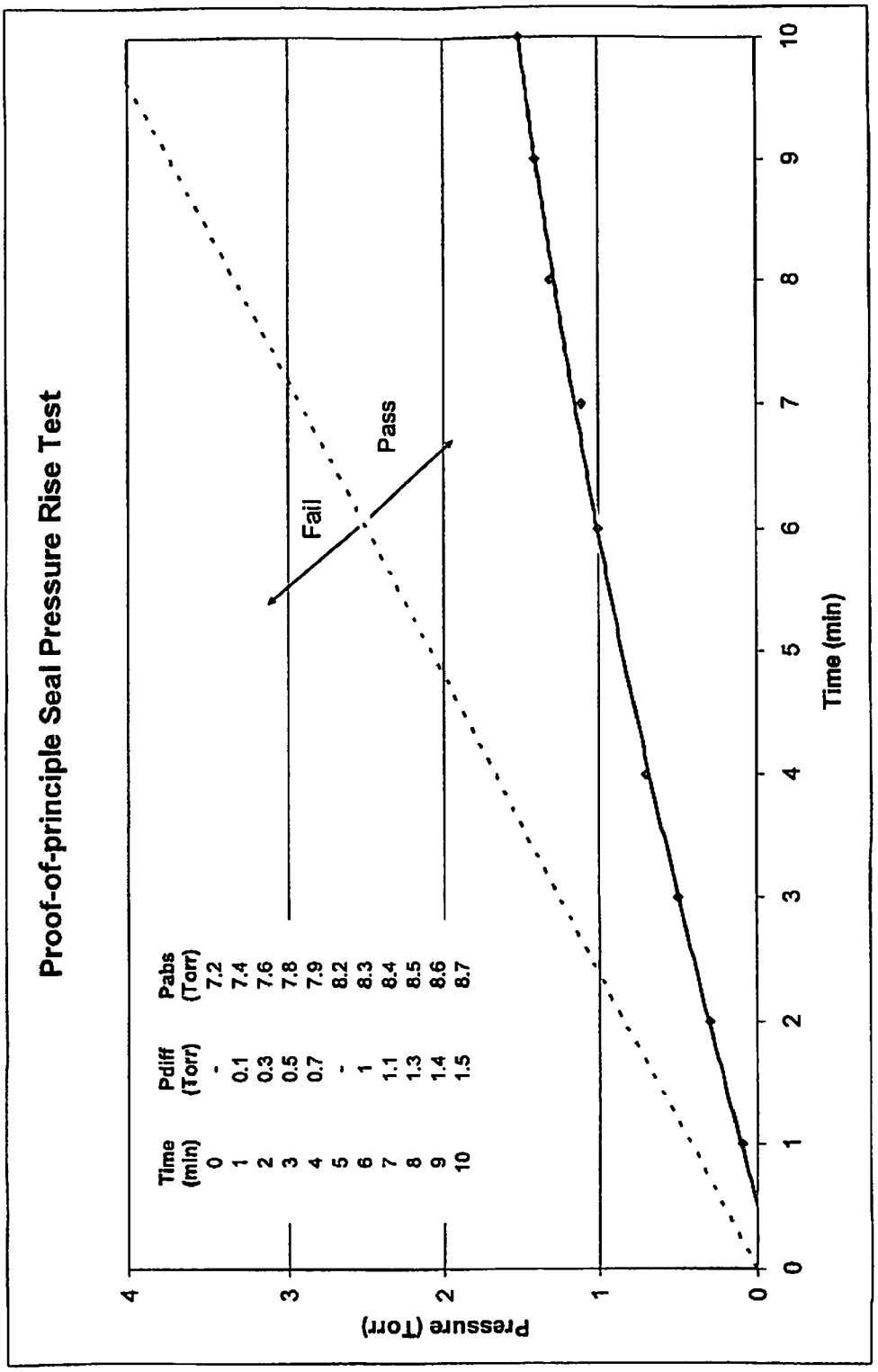
FIG. 2 shows leak test data on a seal in a test device.

In one embodiment of the method to determine leakage from a test device, fluidic connections (such as stainless steel tubing lines) are made between the PPM and the test device as well as between the PPM and the compressed gas (for example, compressed air using as a rubber hose compatible with compressed air) source. A vacuum is established in both the test device as well as within the manifold of the PPM by using the control valve 14 to provide a connection between the vacuum source and the test device and to provide a fluidic connection between the vacuum source and the manifold. A vacuum level of >1 Torr is sufficient; a vacuum level of approximately 10 Torr is generally sufficient. Generally, other leak test devices and methods require the establishment of a vacuum level down to much less than 1 Torr, which greatly increases the testing time as well as generally requiring an A/C power source for the vacuum source. Once the vacuum conditions within the manifold and test device have been established, the control valve is positioned to establish a fluidic connection between the manifold and test device, and to isolate manifold and test device from the vacuum means. If the test device has gas leakage from any elements within the test device or between the test device and the external environment, the pressure will change. The pressure means 17 measures the differential pressure between the two as a function of time; this pressure change can be recorded manually or the pressure means 17 can be electronically connected to a recording device such as a computer or other standard output device. The rate of leakage from the test device, if any, can thus be determined and compared to a pre-set level of acceptance. In this embodiment, leakage rates of approximately $5 \times 10^{-4}$ atm cm$^3$/s to approximately $1 \times 10^{-1}$ atm cm$^3$/s can be determined; however, this range can be adjusted to fit a particular application by changing the magnitude of the volumes involved, the ranges of the pressure gauges, and the time duration of the test. FIG. 2 shows data from a leakage test performed with one embodiment of the present invention, testing a device to determine leakage from a window present in the test device. The figure shows the pressure rise as a function of time, showing that leakage rates can be determined in several minutes.

The volume of the test device is important in some applications to help interpret the measured leakage rate. In another embodiment, the volume of the test device can be determined by first evacuating the standard volume container (in one embodiment with a volume of between 100 mL and 1000 mL) to a set pressure utilizing the connection to the vacuum means; this base vacuum pressure is recorded. The compressed gas is then directed by the control valve such that the manifold and test device are vented to atmospheric pressure but the standard volume container remains under vacuum. The value for the atmospheric pressure is displayed by the absolute pressure means 16 and recorded. The volume of the manifold system (manifold and associated connection lines and valves) can be determined by first switching the control valve to establish a fluidic connection between the standard volume container and the manifold system (with the test device isolated by a valve).

The different pressure is measured and the volume of the manifold system is calculated from the known atmospheric pressure, the known vacuum pressure, the differential pressure measured and the known standard container volume (utilizing the known relationship that pressure, temperature, volume, and time is a constant in a closed system). To calculate the test device volume, the test device is fluidically connected to the manifold system and the pressure differential is again measured. The volume of the test device is calculated from the known vacuum pressure, the atmospheric pressure, the pressure after expansion and the known manifold system and standard container volumes, using the equation (assuming isothermal conditions; the effect of temperature can be included if necessary according to known relationships):

$$V_{test} = (P_{final} - P_{vacuum})V_{std}/(P_{atm} - P_{final}) - V_{manifold}$$

where $V_{test}$ is the volume of the test device;

$V_{test}$ is the final pressure in the test device;

$P_{vacuum}$ is the established known vacuum pressure;

$V_{std}$ is volume of the standard volume container;

$P_{atm}$ is the pre-determined pressure (such as atmospheric); and $V_{manifold}$ is the manifold volume.

Figure 3:
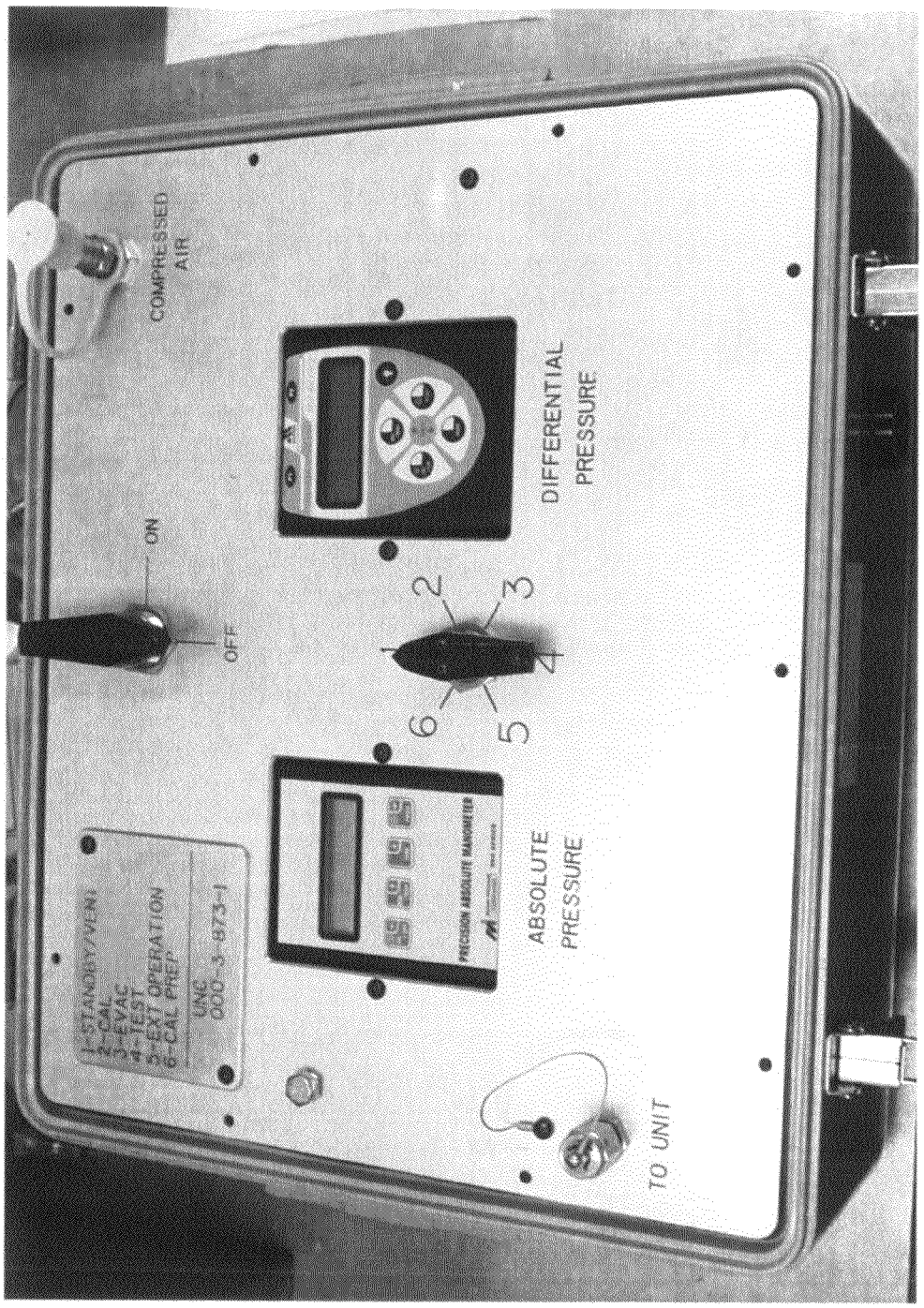
FIG. 3 shows a photograph on the external housing of one embodiment of the present invention.

The non-AC-powered leak tester and volume calibration system is designed to be modular and easy-to-use. One embodiment of this invention is shown in the photograph of FIG. 3. This system consists of the front panel (standard rack mount), an absolute pressure gauge, a differential pressure gauge, a ball valve for turning the compressed air flow on and off, an instrument valve for directing the compressed air, numerous pneumatically-controlled valves behind the front panel, a venturi pump, a calibrated volume (nominally 300 cc), numerous fittings and tees, a compressed air quick-connect fitting (panel mounted) and a ¼" VCR port (panel mounted) for connecting to the test device/manifold.

The system shown in FIG. 3 was designed to be mounted on a standard 19 inch wide rack mount panel with only two connections needed: one for compressed air and the other for the test device. Two valves are attached to the panel comprising the top of the system housing; one valve is for starting and stopping the flow of the compressed air, and the other valve is for controlling the functions (via operating various pneumatic valves) of this invention. The compressed air valve can be a simple on/off ball valve. The control valve is a control valve that allows for the directing of compressed air to one port at a time, and the venting of the rest of the ports as the valve is turned from one position to the next. The purpose of this valve is merely to direct the flow of compressed air to the various functions under the panel. The ability to vent the line between operations is a very important feature that allows the pneumatic valves to return to their normal state as the control valve is moved to the next position, which causes the operation of more valves. Two pressure gauges are mounted on the panel, one absolute pressure gauge and the other a differential pressure gauge. The absolute pressure gauge is used to measure the pressure inside the manifold, and the differential pressure gauge is used to measure the rate of pressure rise during the diagnostic testing. Either a digital or an analog gauge can be used. Digital pressure gauges use either 1.5V (for example, AA batteries) or 9V batteries, and the analog pressure gauges (e.g., dial gauges) use no batteries at all. Behind the panel, many valves exist that are connected by stainless steel tubing, which make up the manifold. A calibrated standard volume is also provided for the volume measurement procedure. The vacuum is provided by a commercially available vacuum pump, such as a venture vacuum pump. Typically this vacuum pump will provide a vacuum of less than 10 Torr. There is no preparation needed prior to using this instrument except for the occasional calibration of the standard volume and the pressure gauges.

The invention being thus described, it will be apparent to those skilled in the art that the same may be varied. Such variations are not to be regarded as a departure from the spirit and scope of the invention, and all such modifications are intended to be included within the scope of the following claims.

We claim:

1. A non-alternating current-powered method for determining the volume of a closed test container, comprising:

connecting a closed test container and compressed gas source to a diagnostic device for determining gas leakage, said diagnostic device comprising a non-alternating current-powered system comprising a housing onto which is mounted a first pressure measurement means for measuring absolute pressure, a second pressure measurement means for measuring a differential pressure and a control valve for directing fluid flow, a manifold connected to said control valve, said control valve capable of directing fluid flow through said manifold, said manifold fluidically connected to said first pressure measurement means and to said second pressure measurement means; a container of known volume fluidically connected to said manifold, and a vacuum means for creating a vacuum fluidically connected to said manifold;

evacuating said container of known volume to a determined vacuum pressure;

venting the closed test container and manifold to a determined atmospheric pressure;

fluidically isolating said manifold and container of known volume and establishing a fluidic connection between said manifold and container of known volume;

calculating the manifold volume;

establishing a fluidic connection between said closed test container and said manifold and container of known volume;

measuring the resulting differential pressure; and calculating the volume of said closed test container.

2. The method of claim 1 wherein the closed test container is evacuated to a pressure of less than approximately 10 Torr and greater than approximately 1 Torr.

3. The method of claim 1 further comprising pneumatic valves situated to control flow of compressed gas in the fluidic connections.

4. The method of claim 1 wherein said compressed gas is compressed air.

5. The method of claim 1 wherein said first pressure measurement means and said second pressure measurement means are digital and powered by a non alternating-current power source.

6. The method of claim 1 wherein said first pressure measurement means and said second pressure measurement means are non-powered analog gauges.

* * * * *